(12) United States Patent
Guen et al.

(10) Patent No.: US 9,065,130 B2
(45) Date of Patent: Jun. 23, 2015

(54) RECHARGEABLE BATTERY

(71) Applicant: Samsung SDI Co., LTD., Yongin-si, Gyeonggi-do (KR)

(72) Inventors: Min-Hyung Guen, Yongin-si (KR); Yong-Sam Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 41 days.

(21) Appl. No.: 13/867,001

(22) Filed: Apr. 19, 2013

(65) Prior Publication Data
US 2014/0141295 A1 May 22, 2014

(30) Foreign Application Priority Data
Nov. 22, 2012 (KR) .................. 10-2012-0133074

(51) Int. Cl.
*H01M 2/00* (2006.01)
*H01M 2/34* (2006.01)
*H01M 10/04* (2006.01)
*H01M 6/46* (2006.01)

(52) U.S. Cl.
CPC ............... *H01M 2/34* (2013.01); *H01M 2/347* (2013.01); *H01M 10/0431* (2013.01); *H01M 10/049* (2013.01); *H01M 6/46* (2013.01); *H01M 2200/00* (2013.01)

(58) Field of Classification Search
CPC .... Y02E 60/12; H01M 2/34; H01M 2200/00; H01M 2/022; H01M 2/06; H01M 2010/4278
USPC ..................................................... 429/61, 64
See application file for complete search history.

(56) References Cited

U.S. PATENT DOCUMENTS 7,785,734 B2    8/2010  Chang et al.
2006/0063063 A1 * 3/2006  Mori et al. ...................... 429/53

FOREIGN PATENT DOCUMENTS

JP          11-67221 A       3/1999
KR    10-2006-0052034 A      5/2006

OTHER PUBLICATIONS

English translation of JP 11-67221 A, published Mar. 9, 1999, 7 pages.

* cited by examiner

*Primary Examiner* — Cynthia H Kelly
*Assistant Examiner* — Monique Wills
(74) *Attorney, Agent, or Firm* — Christie, Parker & Hale LLP

(57) ABSTRACT

A rechargeable battery includes: an electrode assembly including a first electrode and a second electrode; a case housing the electrode assembly; and a safety member including a short circuit guide portion between the case and the electrode assembly, the short circuit guide portion including a plurality of holes and a connection portion electrically connecting the short circuit guide portion and the second electrode.

9 Claims, 7 Drawing Sheets

RECHARGEABLE BATTERY

RELATED APPLICATIONS

This application claims priority to and the benefit of Korean Patent Application No. 10-2012-0133074 filed in the Korean Intellectual Property Office on Nov. 22, 2012, the entire contents of which are incorporated herein by reference.

BACKGROUND

1. Field

The described technology relates generally to a rechargeable battery.

2. Description of the Related Art

A rechargeable battery can be repeatedly charged and discharged, unlike a primary battery that is not designed to be recharged. A rechargeable battery of a low (or small) capacity is used for small portable electronic devices, such as a mobile phone, a laptop computer and a camcorder, among other things, and a rechargeable battery of a large capacity is used as a power source for driving a motor of a hybrid vehicle or a large capacity power storage device, among other uses.

Nowadays, a high power rechargeable battery using a non-aqueous electrolyte of a high energy density has been developed, and in order to use when driving a motor of a device, for example, an electric vehicle requiring high power, the high power rechargeable battery is formed to be a large capacity battery module by coupling in series a plurality of rechargeable batteries. Such a rechargeable battery may be formed in a cylindrical shape or a rectangular (e.g., square) shape, among other shapes.

When a conductive foreign substance such as a nail or a gimlet enters from the outside of the rechargeable battery to the inside thereof, a short circuit may occur within the rechargeable battery. In this way, when a short circuit occurs, an internal temperature of the rechargeable battery may sharply increase and thus the rechargeable battery may catch fire or explode.

For example, a conductive foreign substance may enter through various directions, and the resulting heat generation level is different according to the advancing direction of the conductive foreign substance and thus it is very difficult to secure the safety of the battery.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention provide a rechargeable battery having advantages of improved safety.

An exemplary embodiment provides a rechargeable battery including: an electrode assembly including a first electrode and a second electrode; a case housing the electrode assembly; and a safety member including a short circuit guide portion between the case and the electrode assembly, the short circuit guide portion having a plurality of holes and a connection portion electrically connecting the short circuit guide portion and the second electrode to each other.

The short circuit guide portion may include a mesh. The short circuit guide portion may include a plurality of first wires connected in a first direction and a plurality of second wires connected in a second direction intersecting the first direction.

The plurality of first wires and the plurality of second wires may be plaited and coupled to each other. The plurality of first wires and the plurality of second wires may also be fixed and coupled to each other.

A plurality of electrode assemblies may be in (e.g., installed within) the case, and the safety member may include a plurality of safety members, each of the plurality of safety members being at the outside of one of the plurality of the electrode assemblies. The electrode assembly may include a plurality of electrode assemblies in (e.g., installed within) the case, and the safety member may include a plurality of safety members, each of the plurality of electrode assemblies being between adjacent ones of the plurality of safety members. The case may be electrically connected to the first electrode.

The first electrode may be a positive electrode, and the second electrode may be a negative electrode. The second electrode may be further to the outside of the electrode assembly than the first electrode.

According to an exemplary embodiment, when a conductor foreign substance invades from the outside, by preventing firing and explosion (e.g., the likelihood of fire or explosion is reduced) due to an internal short circuit, safety of a rechargeable battery is improved.

Further, because a plurality of holes are formed in a safety member, when a conductive foreign substance invades, the conductive foreign substance is inserted into the hole and is guided and thus heat generation is suppressed, whereby safety is further improved.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
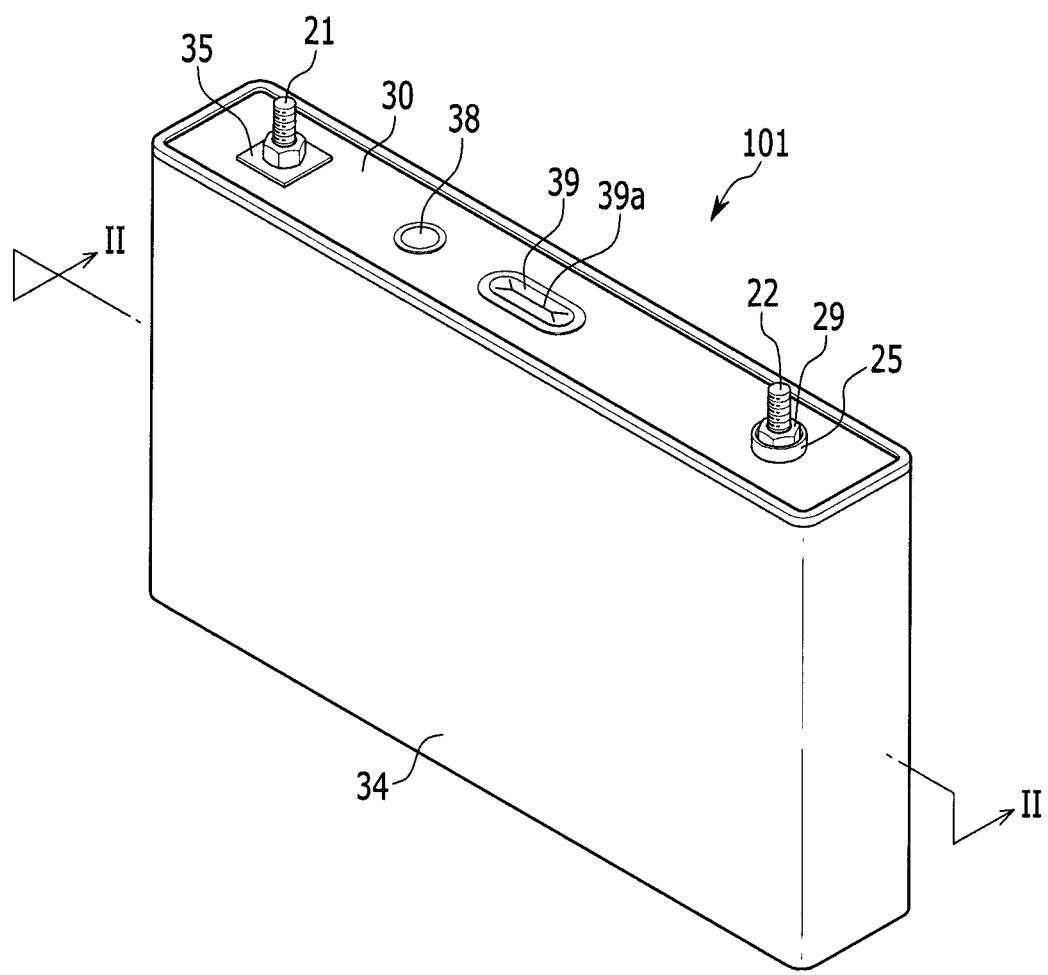
FIG. 1 is a perspective view illustrating a rechargeable battery according to a first exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Like reference numerals designate like elements throughout the specification and the drawings.

Figure 2:
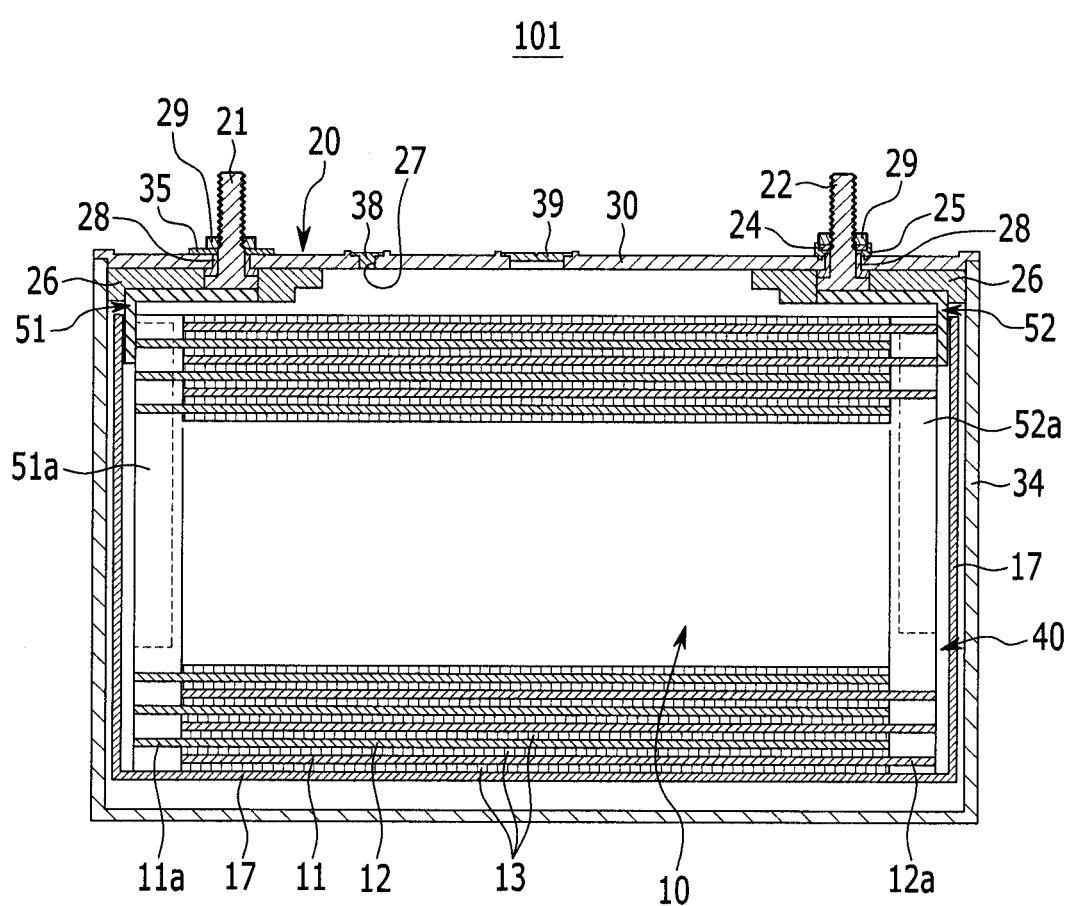
FIG. 2 is a cross-sectional view illustrating the rechargeable battery taken along the line II-II of FIG. 1.

FIG. 1 is a perspective view illustrating a rechargeable battery according to a first exemplary embodiment of the present invention, and FIG. 2 is a cross-sectional view illustrating the rechargeable battery taken along the line II-II of FIG. 1.

Referring to FIGS. 1 and 2, a rechargeable battery 101 according to a first exemplary of the present invention includes a plurality of electrode assemblies 10 (shown in FIG. 2) including a separator 13 between a positive electrode 11 and a negative electrode 12 and by spiral-winding them, a case 34 housing (e.g., containing) the electrode assemblies 10, and a cap assembly 20 coupled to an opening of the case 34.

The rechargeable battery 101 according to the first exemplary embodiment is a lithium ion rechargeable battery and has a rectangular (e.g., square) shape. However, the present invention is not limited thereto and can be applied to a battery of various forms such as a lithium polymer battery or a cylindrical battery.

The positive electrode 11 includes a positive coated region, which is an area of a current collector in which an active material is (or has been) applied, the current collector including a metal foil (e.g., a thin plate made of aluminum), and the positive electrode includes a positive uncoated region 11a, which is an area in which an active material is not coated. The negative electrode 12 includes a negative coated region, which is an area of another current collector in which an active material is (or has been) applied, the current collector including a metal foil (e.g., a thin plate made of copper), and the negative electrode includes a negative uncoated region 12a, which is an area in which an active material is not coated.

Here, the positive electrode 11 is a second electrode that is connected to a case 34, and the negative electrode 12 is a first electrode that is connected to a safety member 40. However, the present invention is not limited thereto, and the positive electrode 11 may be a first electrode, and the negative electrode 12 may be a second electrode.

In the present exemplary embodiment, two electrode assemblies 10 are in (e.g., installed within) the case 34, but the present invention is not limited thereto, and at least one electrode assembly may be in (e.g., installed within) the case.

As shown in FIG. 2, the positive uncoated region 11a is located at the side end of one side of the positive electrode 11 in a length direction of the positive electrode 11, and the negative uncoated region 12a is formed at the side end of the other side of the negative electrode 12 in a length direction of the negative electrode 12 (e.g., at a side of the negative electrode 12 opposite to the positive uncoated region 11a of the positive electrode 11). The positive electrode 11 and the negative electrode 12 are spiral-wound with the separator 13, which is an insulator interposed therebetween. Further, at an outer surface of the electrode assembly 10, a finish tape (not shown) that supports a form of the electrode assembly 10 is installed (e.g., located or applied).

However, the present invention is not limited to the above-described embodiments, and the electrode assembly 10 may have a structure in which a positive electrode and a negative electrode are arranged as a plurality of alternately stacked sheets having a separator interposed therebetween.

The case 34 is approximately cuboid (e.g., has an approximately cuboid shape), and at one surface thereof, an opened opening is formed (e.g., located). As shown in FIG. 2, an insulation encapsulation portion 17 for insulation is installed (e.g., located) between the case 34 and the electrode assemblies 10. The insulation encapsulation portion 17 includes a thin film (e.g., is formed in a film form), and an upper portion thereof is opened (e.g., has an opening).

The cap assembly 20 includes a cap plate 30 that covers the opening of the case 34, a positive terminal 21 protruding (e.g., extending) to the outside of the cap plate 30 and electrically connected to the positive electrode 11, a negative terminal 22 protruding (e.g., extending) to the outside of the cap plate 30 and electrically connected to the negative electrode 12, and a vent member 39 having a notch 39a to be torn (e.g., ruptured) according to a predetermined or preselected internal pressure.

The cap plate 30 includes a thin plate (e.g., is formed as a thin plate), an electrolyte injection opening 27 for injecting an electrolyte solution at one side of the cap plate 30, and a seal stopper 38 installed (e.g., located) in the electrolyte injection opening 27.

A lower gasket 28 is installed (e.g., located) between the cap plate 30 and the terminals 21 and 22 to seal the cap plate 30 and the terminals 21 and 22. In this description, the terminals 21 and 22 include the positive terminal 21 and the negative terminal 22.

The lower gasket 28 is inserted into and is installed in a terminal hole (e.g., a hole in which the terminal 21 or 22 is located) and is located to have close contact with a lower surface of the cap plate 30. The terminals 21 and 22 are formed in a circular cylindrical shape, and in the terminals 21 and 22, a nut 29 that supports the terminals 21 and 22 in an upper part is installed, and in an external circumference of the terminals 21 and 22, a screw is formed to fasten the nut 29 (e.g., the terminals 21 and 22 each have threads for fastening the nut 29).

At the positive terminal 21, a connection plate 35 is inserted (e.g., located), and the connection plate 35 is installed (e.g., located) between the nut 29 and the cap plate 30. The connection plate 35 performs a function of electrically connecting the cap plate 30 and the positive terminal 21. Accordingly, the cap plate 30 and the case 34 are electrically connected to the positive electrode 11.

An upper gasket 25 is located at the negative terminal 22, and the upper gasket 25 is located on the lower gasket 28 to contact an upper surface of the cap plate 30. The upper gasket 25 performs a function of insulating the negative terminal 22 and the cap plate 30 from one another. On the upper gasket 25, a washer 24 that buffers a fastening force is installed (e.g., located) between the nut 29 and the upper gasket 25.

In a lower portion of the terminals 21 and 22, a lower insulation member 26 that insulates the cap plate 30 and the terminals 21 and 22 is installed (e.g., located).

A current collecting member 51 that is electrically connected to the positive electrode 11 is attached to the positive terminal 21 by welding, and the positive terminal 21 and the current collecting member 51 is inserted into a groove that is formed (e.g., located) at a lower surface of the lower insulation member 26. The current collecting member 51 includes a plurality of tabs 51a that are protruded (e.g., extended) to a lower part, and the plurality of tabs 51a are attached to the respective positive uncoated region 11a by welding.

A current collecting member 52 that is electrically connected to the negative electrode 12 is attached to the negative terminal 22 by welding, and the negative terminal 22 and the current collecting member 52 is inserted into a groove that is formed (e.g., located) at a lower surface of the lower insulation member 28. The current collecting member 52 includes a plurality of tabs 52a that are protruded (e.g., extended) to a lower part, and the plurality of tabs 52a are attached to the respective negative uncoated region 12a by welding.

Safety members (described in more detail below) that are electrically connected to the negative electrode 12 are installed (e.g., located) between the electrode assemblies 10 and at outer side surfaces of electrode assemblies 10 that are (e.g., located) at the outside thereof.

Figure 3:
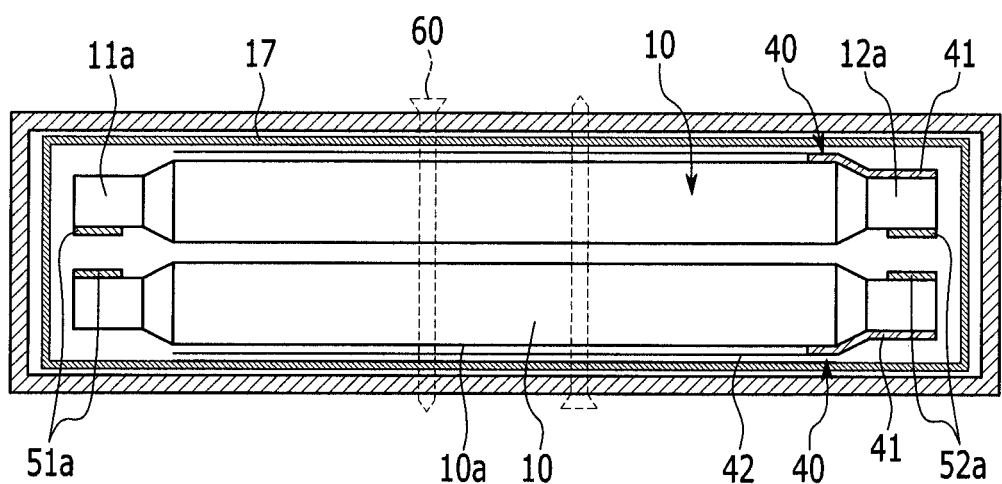
FIG. 3 is a transverse cross-sectional view illustrating a rechargeable battery according to the first exemplary embodiment of the present invention.
Figure 4:
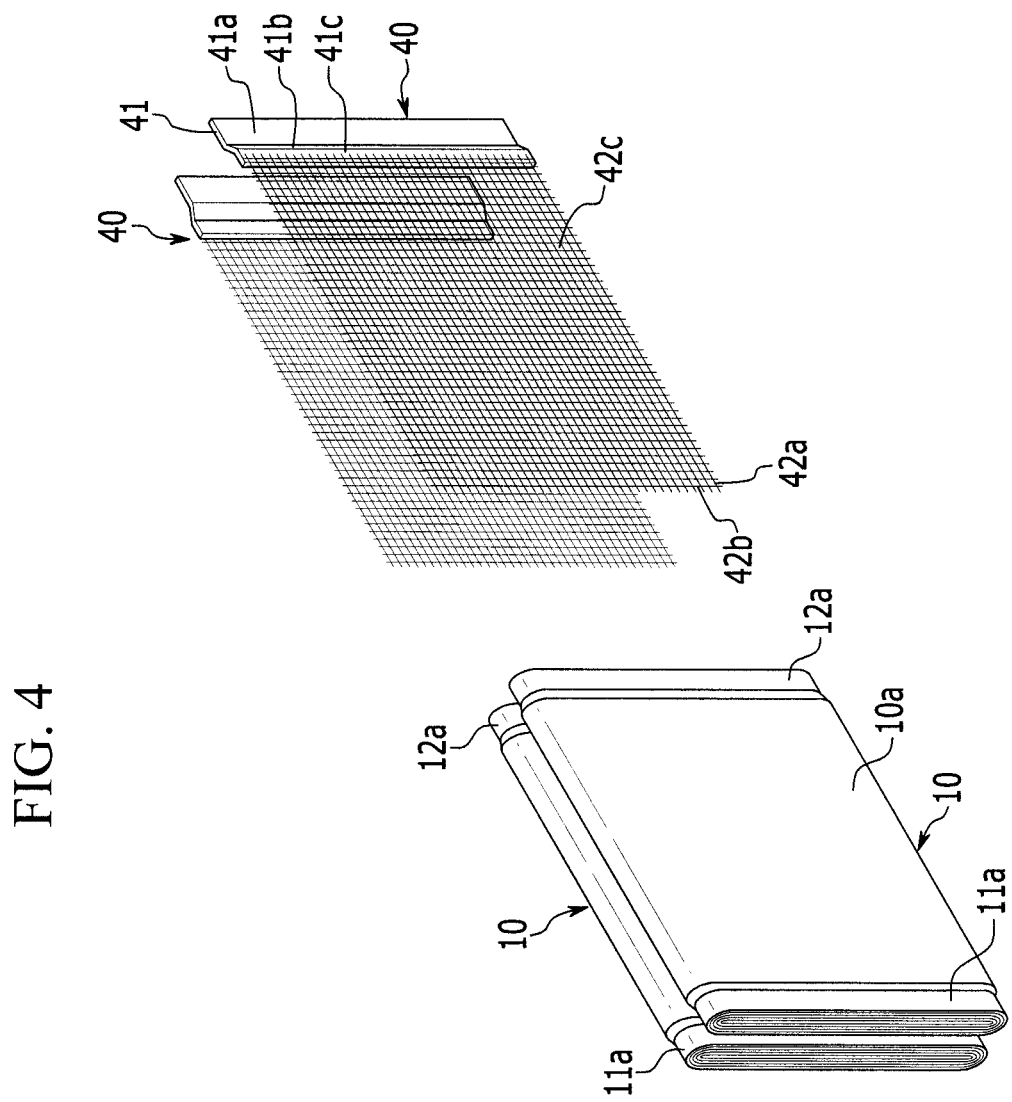
FIG. 4 is an exploded perspective view illustrating an electrode assembly and a safety member according to the first exemplary embodiment of the present invention.

FIG. 3 is a transverse cross-sectional view illustrating a rechargeable battery according to the first exemplary embodiment of the present invention, and FIG. 4 is an exploded perspective view illustrating an electrode assembly and a safety member according to the first exemplary embodiment of the present invention.

Referring to FIGS. 3 and 4, the safety member 40 is disposed at the side end of both sides of the stacked electrode assemblies 10. The safety member 40 includes a short circuit guide portion 42 that is attached to a flat surface 10a that is widely formed in the electrode assembly 10 (e.g., the widest portion of the electrode assembly 10) and a connection portion 41 that is connected to the short circuit guide portion 42 and that is attached to the negative uncoated region 12a. In this description, the flat surface 10a indicates a flat surface, except for a bent portion of an upper end portion and a lower end portion in an external circumferential surface of the electrode assembly 10.

The short circuit guide portion 42 and the connection portion 41 include a metal plate having conductivity such as copper and stainless steel. The connection portion 41 is bent toward the negative uncoated region 12a of the adjacent electrode assembly 10, and the connection portion 41 has a support portion 41c to which the short circuit guide portion 42 is fixed by welding, a tilt portion 41b that is obliquely bent from the support portion 41c toward a negative uncoated region 12a of one side of the negative electrode, and a welding portion 41a that is bent at the tilt portion 41b and that is formed parallel to the short circuit guide portion 42. The connection portion 41 is welded to the adjacent negative uncoated region 12a to be electrically connected to the negative uncoated region 12a.

The short circuit guide portion 42 includes a mesh body (e.g., is formed in a mesh body form) in which a plurality of holes 42c are formed. The short circuit guide portion 42 includes first wires 42a that are connected in a side direction and second wires 42b that are connected in a height direction.

The first wires 42a are connected and arranged to be parallel in a side direction of the rechargeable battery 101, and the second wires 42b are connected and arranged to be parallel in a height direction of the rechargeable battery 101. The first wires 42a and the second wires 42b are fixed to each other to form a mesh body.

Figure 5:
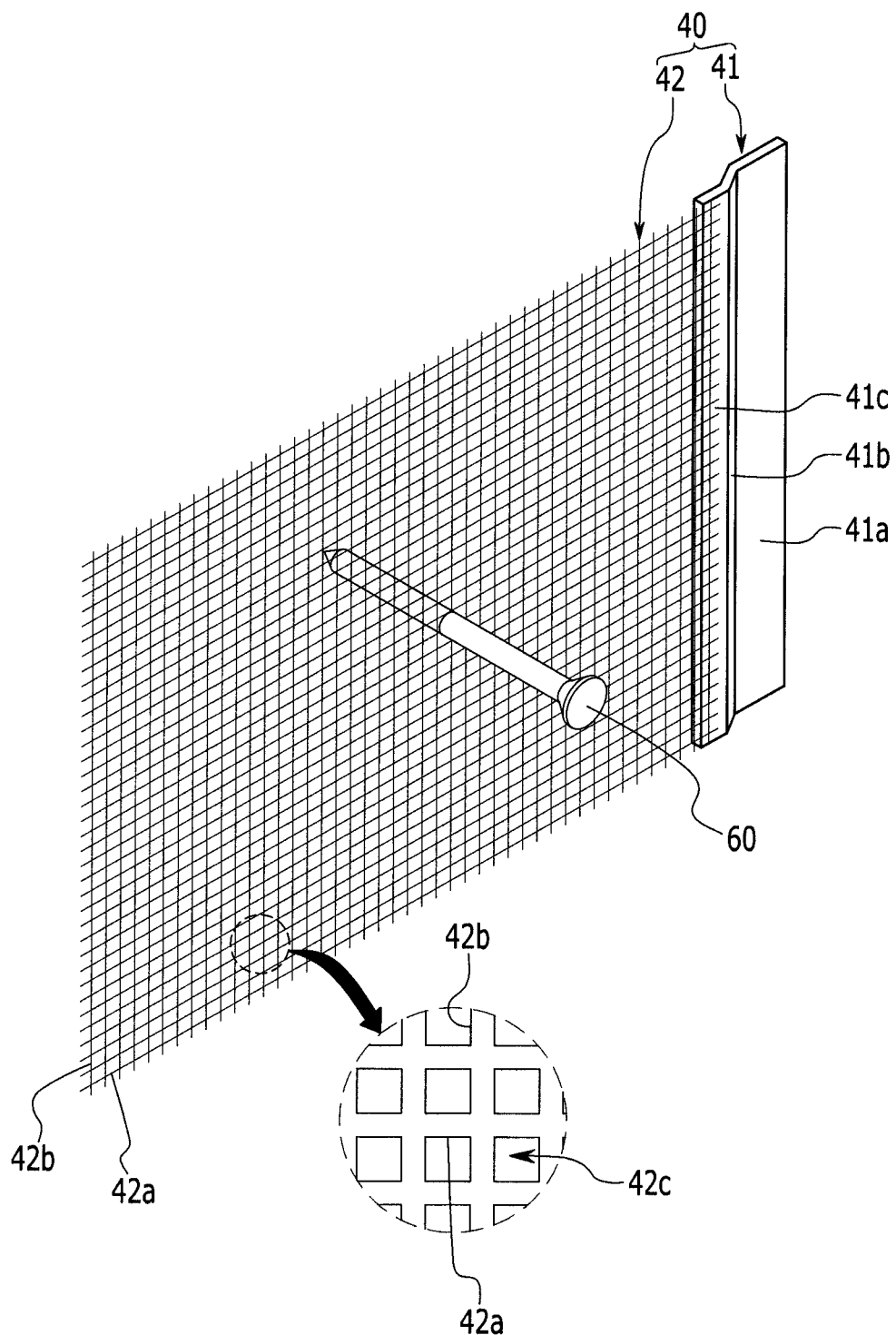
FIG. 5 is a perspective view illustrating a safety member according to the first exemplary embodiment of the present invention.

As can be understood from FIG. 5, when a conductive foreign substance 60 such as a nail or a gimlet invades from the outside of the rechargeable battens 101 due to an impact or an accident, if the safety member 40 is not present and a positive electrode and a negative electrode are short-circuited using the conductive foreign substance 60 as an intermediary, excessive heat is generated at the inside of the battery and, as a result, the rechargeable battery 101 may explode or catch fire. However, as in the present exemplary embodiment, when the safety member 40 is installed (e.g., included in the rechargeable battery), the safety member 40 and the case 34 are short-circuited and thus a charged current can be safely discharged.

In this way, according to the present exemplary embodiment, as the foreign substance 60, such as a nail, invades (e.g., penetrates) from the outside, when a danger of a short circuit exists, by discharging a current, a danger of fire is removed (or reduced) and, thus, the safety of the rechargeable battery 101 is improved.

Further, when the conductive foreign substance 60 from the outside invades (e.g., penetrates the rechargeable battery), the conductive foreign substance 60 is inserted into a hole 42c that is formed (e.g., located) in the short circuit guide portion 42, and the hole 42c is extended while a first wire 42a and a second wire 42b are deformed. The conductive foreign substance 60 is guided to the hole 42c to invade (e.g., penetrate) the electrode assemblies 10 in a direction substantially vertical (e.g., substantially perpendicular) to the short circuit guide portion 42. When a plurality of holes 42c are formed in the short circuit guide portion 42, as in the present exemplary embodiment, if the conductive foreign substance 60 is inserted into the hole 42c and advances to the rechargeable battery 101 and particularly, when the short circuit guide portion 42 is formed in a mesh body, the wires 42a and 42b are deformed to guide the conductive foreign substance 60.

If the short circuit guide portion 42 is formed (e.g., arranged) in a general metal plate form, when the conductive foreign substance 60 contacts with the short circuit guide portion 42, the conductive foreign substance 60 slips or a first invasion (e.g., penetration) direction is inclined, and thus the conductive foreign substance 60 invades (e.g., penetrates) the electrode assembly 10 in a tilt direction to the short circuit guide portion 42. In this case, as a contact area of the conductive foreign substance 60 and the electrode assembly 10 increases, compared with a quantity of a current that is discharged by the safety member 40, much heat occurs (e.g., is generated) and, thus, danger of explosion of the rechargeable battery 101 increases.

However, when the short circuit guide portion 42 is formed (e.g., arranged) in a mesh body form, as in the present exemplary embodiment, the first wire 42a and the second wire 42b can support, at least somewhat, a conductive foreign substance and thus the short circuit guide portion 42 guides the conductive foreign substance 60 to advance in a direction almost vertical (e.g., perpendicular) to the short circuit guide portion 42.

Further, according to the present exemplary embodiment, the positive electrode 11 and the negative electrode 12 are spiral-wound with the separator 13 interposed therebetween, and in the electrode assembly 10, the negative electrode 12 is positioned further at the outside of the electrode assembly 10 than the positive electrode 11.

Accordingly, when the negative electrode 12 is positioned further at the outside of the electrode assembly 10 than the positive electrode 11 and the conductive foreign substance 60 invades (e.g., penetrates) the rechargeable battery, before the conductive foreign substance 60 contacts with the positive electrode 11, the conductive foreign substance 60 first contacts with the negative electrode 12. Accordingly, before the positive electrode 11 and the negative electrode 12 are short-circuited by the conductive foreign substance 60, the conductive foreign substance 60, the safety member 40, and the negative electrode 12 are first short-circuited and thus the conductive foreign substance 60 absorbs heat generated due to short circuit with the negative electrode 12 and thus heat generation is suppressed for reduced), whereby an internal temperature of the electrode assembly 10 is suppressed from excessively rising (e.g., excessive temperature increase is reduced).

When the conductive foreign substance 60 and the safety member 40 first contact one another, as the case 34, which is electrified as a positive electrode, and a safety member, which is electrified as a negative electrode, are electrically connected, discharge is performed, but when the conductive foreign substance 60 passes through the electrode assembly 10, the positive electrode 11 and the negative electrode 12 in which a current remains are short-circuited.

In this case, when the positive electrode 11 is positioned at the outside of the electrode assembly 10, even if the conductive foreign substance 60, which is electrified as the positive electrode 11, and the positive electrode 11 meet, discharge does not occur, and a current is accumulated in the conductive foreign substance 60, and when the conductive foreign substance 60 further advances and contacts with the negative electrode 12, a short-circuit occurs and an excessive heat occurs (e.g., is generated). However, as in the present exemplary embodiment, when the case 34 is electrified as a positive electrode and the negative electrode 12 is positioned at the outside of the electrode assembly 10, a discharged state results from a short circuit of the conductive foreign substance 60 and the negative electrode 12, and because the negative electrode 12 and the positive electrode 11 contact, the positive electrode 11 and the negative electrode 12 can be prevented from being directly short-circuited through or by the conductive foreign substance 60 (or the likelihood of the positive electrode 11 and the negative electrode 12 being directly short-circuited through or by the conductive foreign substance 60 is reduced).

Figure 6:
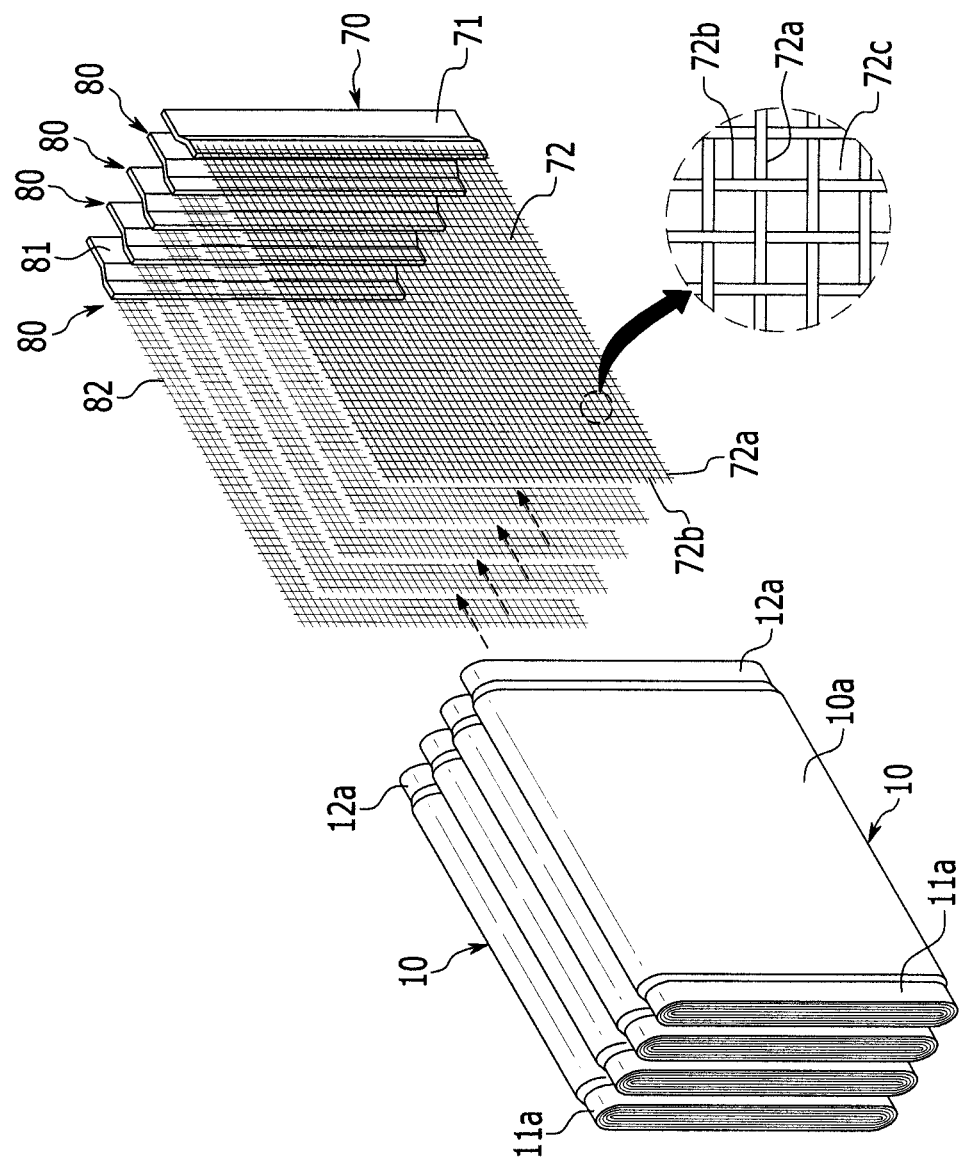
FIG. 6 is an exploded perspective view illustrating an electrode assembly and a safety member according to a second exemplary embodiment of the present invention.
Figure 7:
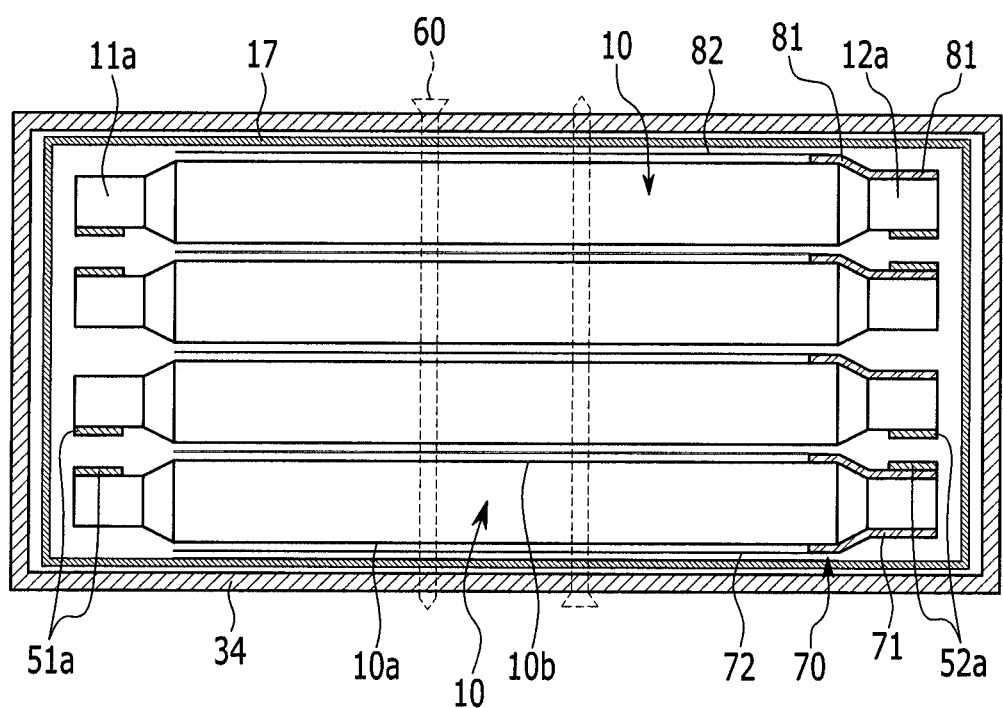
FIG. 7 is a longitudinal cross-sectional view illustrating a rechargeable battery according to the second exemplary embodiment of the present invention.

FIG. 6 is an exploded perspective view illustrating an electrode assembly and a safety member according to a second exemplary embodiment of the present invention, and FIG. 7 is a longitudinal cross-sectional view illustrating a rechargeable battery according to the second exemplary embodiment of the present invention.

A rechargeable battery 102 according to the present exemplary embodiment has the same structure as that of the rechargeable battery 161 according to the first exemplary embodiment, except for the number of the electrode assemblies 10 and the number of the safety members that are inserted into a case 34 and, therefore, repetitive description of the structures that are the same (or substantially the same) will be omitted.

Referring to FIGS. 6 and 7, the rechargeable battery 102 according to the present exemplary embodiment includes a case 34, a plurality of electrode assemblies 10 that are inserted into the case 34, and a safety member that is located between the electrode assemblies 10 and at the outside (e.g., at a side of each) of the electrode assemblies 10.

A positive uncoated region 11a is located at the side end of one side of the electrode assembly 10, and a negative uncoated region 12a is located at the side end of the other side thereof. In the positive uncoated region 11a, a current collecting member 51 that electrically connects the positive electrode 11 and a positive terminal is installed (e.g., located), and in the negative uncoated region 12a, a current collecting member 52 that electrically connects the negative electrode 11 and a negative terminal is installed (e.g., located). An insulation encapsulation portion 17 for insulation is installed (e.g., located) between the case 34 and the electrode assemblies 10. The insulation encapsulation portion 17 is formed in a film form (e.g., is a film), and an upper portion thereof is open.

At the side end of one side of the stacked electrode assemblies 10, a safety member 70 is installed (e.g., located), and a safety member 80 (or safety members 80) is (or are) installed (e.g., located) between other sides of the side ends of the stacked electrode assemblies 10.

The safety member 70 includes a short circuit guide portion 72 that is installed adjacent to a flat surface 10a of one side of the electrode assembly 10 and a connection portion 71 that is connected to the short circuit guide portion 72 and that is attached to the negative uncoated region 12a. The short circuit guide portion 72 and the connection portion 71 are made of a metal having conductivity (e.g., good electrical conductivity) such as copper and/or stainless steel.

The short circuit guide portion 72 is formed in a mesh body form (e.g., is a mesh body) in which a plurality of holes 72c are formed. The short circuit guide portion 72 includes first wires 72a that are connected in a side direction and second wires 72b that are connected in a height direction.

The first wires 72a are connected (e.g., electrically connected) and are pa (or substantially parallel) to one another in a side direction of the rechargeable battery 102, and the second wires 72b are connected (e.g., electrically connected) and are parallel (or substantially parallel) in a height direction of the rechargeable battery 102. The first wires 72a and the second wires 72b are plaited and coupled to each other. For example, the first wires 72a and the second wires 72b are plaited and coupled to one another while being alternately positioned at the front and the rear. In another embodiment, the first wires 72a and the second wires 72b are fixed (e.g., welded) and coupled to each other to provide the holes 72c.

The safety member 80 includes a short circuit guide portion 82 that is installed (e.g., located) adjacent to a flat surface 10b of the other side of the electrode assembly 10 (e.g., the side of the electrode assembly 10 opposite to the side 10a of the electrode at which the short circuit guide portion 72 is located) and a connection portion 81 that is connected to the short circuit guide portion 82 and attached to the negative uncoated region 12a. The short circuit guide portion 82 and the connection portion 81 are made of a metal having conductivity (e.g., electrical conductivity) such as copper and/or stainless steel.

The short circuit guide portion 82 is between the outside of the other side of the electrode assembly 10 and the electrode assemblies 10. The short circuit guide portion 82 is formed in a mesh body form (e.g., is a mesh body) in which a plurality of holes are formed. The short circuit guide portion 82 includes first wires that are connected in a side direction and second wires that are connected in a height direction, and the first wires and the second wires are plaited and coupled.

As can be understood from FIG. 7, when the conductive foreign substance 60 such as a nail or a gimlet invades (e.g., penetrates) from the outside of the rechargeable battery 102 due to an impact or an accident, if the safety members 70 and 80 are not present and the positive electrode and the negative electrode are short-circuited using the conductive foreign, substance 60 as an intermediary, an excessive heat generates at the inside of the rechargeable battery and thus the rechargeable battery 102 may explode or catch fire. However, as in the present exemplary embodiment, when safety members 70 and 80 are installed (e.g., included in the rechargeable battery), the safety members 70 and 80 and the case 34 are short-circuited and thus a charged current is safely discharged.

Further, as in the present exemplary embodiment, when a plurality of holes are formed in the short circuit guide portions 72 and 82, the conductive foreign substance 60 is inserted into at least one of the holes and advances to the rechargeable battery 102, particularly, when the short circuit guide portions 72 and 82 are formed in a mesh body form and wires are plaited, wires are deformed to guide the conductive foreign substance 60.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and equivalents thereof.

<Description of symbols>

| | |
|---|---|
| 101, 102: rechargeable battery | 10a: first flat surface |
| 10: electrode assembly | 11: positive electrode |
| 10b: second flat surface | 11a: positive uncoated region |
| 12: negative electrode | 13: separator |
| 12a: negative uncoated region | 20: cap assembly |
| 17: insulation encapsulation portion | 22: negative terminal |
| 21: positive terminal | 24: washer |
| 21a 22a: terminal flange | 26: insulation member |
| 25: gasket | 29: nut |
| 27: electrolyte injection opening | 32: lead member |
| 30: cap plate | 38: seal stopper |
| 34: case | 39a: notch |
| 39: vent member | 41, 71, 81: connection portion |
| 40, 70, 80: safety member | |
| 42, 72, 82: short circuit guide portion | |

What is claimed is:

1. A rechargeable battery, comprising:
an electrode assembly comprising a first electrode and a second electrode;
a case housing the electrode assembly; and
a safety member comprising a short circuit guide portion between the case and the electrode assembly, the short circuit guide portion having a plurality of holes and a connection portion electrically connecting the short circuit guide portion and the second electrode to each other, wherein the short circuit guide portion comprises a mesh.

2. The rechargeable battery of claim 1, wherein the short circuit guide portion comprises a plurality of first wires connected in a first direction and a plurality of second wires connected in a second direction intersecting the first direction.

3. The rechargeable battery of claim 2, wherein the plurality of first wires and the plurality of second wires are plaited and coupled to each other.

4. The rechargeable battery of claim 2, wherein the plurality of first wires and the plurality of second wires are fixed and coupled to each other.

5. The rechargeable battery of claim 1, wherein the electrode assembly comprises a plurality of electrode assemblies in the case, and the safety member comprises a plurality of safety members, each of the plurality of safety members being at the outside of one of the plurality of electrode assemblies.

6. The rechargeable battery of claim 1, wherein the electrode assembly comprises a plurality of electrode assemblies in the case, and the safety member comprises a plurality of safety members, each of the plurality of electrode assemblies being between adjacent ones of the plurality of safety members.

7. The rechargeable battery of claim 1, wherein the case is electrically connected to the first electrode.

8. The rechargeable battery of claim 1, wherein the first electrode is a positive electrode, and the second electrode is a negative electrode.

9. The rechargeable battery of claim 8, wherein the second electrode is located further to the outside of the electrode assembly than the first electrode.

* * * * *